(12) United States Patent
Becker et al.

(10) Patent No.: US 11,201,520 B2
(45) Date of Patent: Dec. 14, 2021

(54) DRIVE DEVICE WITH CIRCULATING AIRFLOW

(71) Applicant: SEW-EURODRIVE GMBH & CO. KG, Bruchsal (DE)

(72) Inventors: Waldemar Becker, Graben-Neudorf (DE); Domenik Hettel, Au am Rhein (DE); Thomas Rung, Flemlingen (DE); Jens Schillinger, Rastatt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 492 days.

(21) Appl. No.: 15/577,737

(22) PCT Filed: Apr. 7, 2016

(86) PCT No.: PCT/EP2016/000570
§ 371 (c)(1),
(2) Date: Nov. 28, 2017

(87) PCT Pub. No.: WO2016/188599
PCT Pub. Date: Dec. 1, 2016

(65) Prior Publication Data
US 2018/0131248 A1    May 10, 2018

(30) Foreign Application Priority Data
May 28, 2015   (DE) .................... 10 2015 006 688.9

(51) Int. Cl.
*H02K 5/20*    (2006.01)
*H02K 9/14*    (2006.01)
(Continued)

(52) U.S. Cl.
CPC ............... *H02K 5/20* (2013.01); *H02K 7/116* (2013.01); *H02K 9/14* (2013.01); *H02K 9/16* (2013.01)

(58) Field of Classification Search
CPC .. H02K 5/20; H02K 9/14; H02K 9/16; H02K 9/12; H02K 9/08; H02K 7/116
(Continued)

(56) References Cited

U.S. PATENT DOCUMENTS 4,082,180 A    4/1978  Chung
4,584,902 A    4/1986  Fry
(Continued)

FOREIGN PATENT DOCUMENTS

CN    2094824 U    1/1992
DE    7 17 830 C    2/1942
(Continued)

OTHER PUBLICATIONS

International Preliminary Report on Patentability issued in international patent application No. PCT/EP2016/000570, dated Nov. 28, 2017 (8 pages total).
(Continued)

*Primary Examiner* — Michael Andrews
(74) *Attorney, Agent, or Firm* — Carter DeLuca & Farrell LLP (57) ABSTRACT

A drive device includes an electric motor and a gear unit that is driven by the electric motor. The electric motor has a laminated stator core which includes stator windings and is accommodated in a stator housing. The stator housing has recesses that are axially uninterrupted, i.e. in particular in the direction of the rotor shaft axis, and the stator housing is surrounded, especially radially surrounded, by a housing of the drive device, in particular a tubular housing and/or a cup-shaped housing, and the housing is set apart from the stator housing, in particular such that an especially circulating airflow is able to be provided within the housing, the recesses in particular guiding the airflow through in the axial direction, and the airflow being returned in the opposite
(Continued)

direction in the set-apart region between the stator housing part and the housing.

17 Claims, 5 Drawing Sheets

(51) Int. Cl.
*H02K 7/116* (2006.01)
*H02K 9/16* (2006.01)

(58) Field of Classification Search
USPC .......................................... 310/52–63, 60 A
See application file for complete search history.

(56) References Cited

U.S. PATENT DOCUMENTS

| | | | |
|---|---|---|---|
| 5,682,074 A * | 10/1997 | Di Pietro | B22D 19/0054 310/215 |
| 2005/0124477 A1 | 6/2005 | Umeda | |
| 2006/0175925 A1 | 8/2006 | Coles | |
| 2008/0197733 A1 | 8/2008 | Oberle et al. | |
| 2009/0208351 A1 * | 8/2009 | Coenraets | H02K 7/1012 417/321 |
| 2013/0076168 A1 | 3/2013 | Memminger et al. | |
| 2014/0292122 A1 * | 10/2014 | Pal | H02K 5/20 310/59 |

FOREIGN PATENT DOCUMENTS

| | | |
|---|---|---|
| DE | 11 34 189 B | 8/1962 |
| DE | 26 34 059 A1 | 2/1978 |
| DE | 33 20 306 A1 | 12/1983 |
| DE | 10 2004 014 989 A1 | 1/2005 |
| DE | 103 37 529 A1 | 1/2005 |
| JP | H11-127556 A | 5/1999 |
| WO | 2011/154205 A2 | 12/2011 |

OTHER PUBLICATIONS

International Report on Patentability issued in international patent application No. PCT/EP2016/000571, dated Nov. 28, 2017 (7 pages total).
International Serach Report dated Jun. 15, 2016, in International Application No. PCT/EP2016/000570. (English translation).
International Serach Report dated Jul. 6, 2016, in International Application No. PCT/EP2016/000571. (English translation).

* cited by examiner

DRIVE DEVICE WITH CIRCULATING AIRFLOW

FIELD OF THE INVENTION

The present invention relates to a drive device.

BACKGROUND INFORMATION

It is generally known that a gear motor is able to be used as a drive device.

SUMMARY

Example embodiments of the present invention provide a gear motor for machinery for the food industry.

According to an example embodiment of the present invention, a drive device includes an electric motor and a gear unit that is driven by the electric motor. The electric motor has a laminated stator core which includes stator windings and is accommodated in a stator housing. The stator housing has recesses that are axially uninterrupted, i.e. especially in the direction of the rotor shaft axis. The stator housing is surrounded, in particular radially surrounded, by a housing of the drive device, in particular a tubular housing and/or a cup-shaped housing, and the housing is set apart from the stator housing, for example, such that an airflow, especially a circulating airflow, is able to be generated within the housing, the recesses in particular guiding the airflow through in the axial direction, and the airflow being returned in the opposite direction in the set-apart region between the stator housing part and the housing.

This has the advantage that the gear motor is surrounded by a housing and may thus be used in machinery for the food industry. Better heat dissipation is provided by the airflow, which carries heat from the stator housing to the housing of the drive unit in a contactless manner. The airflow absorbs the heat generated by the motor and outputs it on the inner side of the housing to the housing. A poorer heat conductor may therefore be used for the housing than for the stator housing inasmuch as the surrounding housing has an internal surface that is larger than the external surface of the stator housing. The diversion of the airflow takes place in the region of the gear unit so that not only heat from the motor but also heat from the gear unit is transferred to the airflow. Effective cooling of the gear motor is possible as a result.

In other words, the airflow distributes the heat in the interior space that is surrounded by the housing. However, the housing and the stator housing are set apart from each other, so there is no direct contact between the two parts. They may therefore be produced from different materials, the housing having a larger internal surface than the external surface of the stator housing due to the radially greater extension, i.e. the shape surrounding the stator housing at a distance. Because of the distancing, even a poorer heat conductor, such as steel, may thus be used for the housing. The use of aluminum for the stator housing allows it to be produced as a continuous casting component, which means that the channels for the airflow are easy to produce. The cover that seals the housing may likewise be made from steel. It may alternatively also be made from plastic, but the cooling through the cover will then be less effective.

The stator housing may be a continuous casting component, in which the drawing direction lies parallel to the axial direction, i.e. parallel to the direction of the rotor shaft axis, in particular. This is considered advantageous inasmuch as it allows for an uncomplicated production; channels are molded in the continuous casting component in the drawing direction so that effective cooling is able to take place. In addition, the length of the stator housing is selectable depending on the motor to be produced. The laminated stator core including the stator windings may easily be slipped into the stator housing, which is provided with a large central recess for this purpose.

The gear unit may include a first housing part and a second housing part, which are connected to each other, the stator housing being connected to the second housing part, in particular with the aid of screws, the housing, in particular the tubular housing and/or the cup-shaped housing, of the drive device being connected to the second housing part, in particular with the aid of screws. This is considered advantageous inasmuch as the motor is held by the gear unit because the screwed connection of the stator housing to the second housing part also retains the laminated stator core and the associated stator windings disposed inside the stator housing. In addition, on its side facing away from the gear unit, the stator housing is able to be connected to a bearing flange, which is connectable to the housing or to a cover connected to the housing on its side facing away from the stator housing, so that bracing of the stator housing on its side facing away from the gear unit is able to take place.

The airflow may flow from the recesses of the stator housing through individual recesses of the second housing part, the recesses in particular being at least partially delimited by fins that project from the second housing part. This offers the advantage that the airflow flows from the channels guided in the stator housing part past the second housing part and only then flows to the housing, in particular the tubular housing. This not only allows for effective cooling of the motor but also for effective cooling of the gear unit.

The stator housing may be made from a second material, and the housing may be made from a first material, the first material having a greater thermal conductivity than the second material. This has the advantage of allowing for effective cooling despite the poor thermal conductivity of the housing. For this purpose, the heat flow is spread apart by the airflow and the heat flow is dissipated into the environment by the housing that surrounds it and thus has a large surface area.

The stator housing may have a coating on the surface facing the housing, particularly on its external surface, in order to increase the emitted heat output. This has the advantage of achieving a reduced heat transfer resistance from the stator housing to the environment.

The housing may have a coating on the surface facing the stator housing, particularly on its internal surface, in order to increase the absorbed heat output. This has the advantage that, once again, a reduced heat transfer resistance from the stator housing to the environment is able to be achieved.

The airflow may be driven convectively, and solely convectively, in particular. This is considered advantageous insofar as no active driving is required.

At least one fan or two fans for driving the airflow may be disposed on a bearing flange of the motor. This offers the advantage of allowing active driving and thus effective cooling.

The bearing flange may have an especially circular base plate section and a separating wall section that is disposed thereon; the separating wall section may be provided to separate the airflow from a space region that in particular surrounds the B-side axial end region of the rotor shaft facing away from the gear unit, or that at least partially surrounds an angle sensor disposed in this end region. This offers the advantage that the space region of the sensor is kept free of dust and is separated from the airflow, so that a flawless operation of the sensor is able to be ensured. In addition, the airflow carries out the cooling, thereby reducing the thermal loading of the sensor, in particular by fewer sudden increases in temperature when the motor is switched on and off or also during the operation.

A bearing of a rotor shaft of the motor may be accommodated in the bearing flange. This has the advantage that the bearing flange is used not only for accommodating a bearing but also for separating the airflow from the space region of the sensor. Moreover, fans that allow for active driving of the airflow are able to be mounted on the bearing flange.

The radial extension of the separating wall section in a first peripheral angle direction may be smaller than in a second peripheral angle direction that differs from the first. This is considered advantageous insofar as one or more fan(s) is/are able to be placed on the narrow side. The active conveyance of the airflow is therefore possible in a space-saving manner.

The fan may be disposed radially outside the separating wall section, and the fan may be set apart from the second peripheral angle direction in the peripheral direction, the peripheral angle region covered by the fan in particular encompassing the first peripheral angle. This has the advantage that the two fans are set apart from each other, and may be placed diametrically opposite each other, in particular, so that the most symmetrical airflow possible is able to be achieved in the motor.

The separating wall section may be situated on the axial side of the base plate section facing away from the gear unit. This has the advantage that the diversion of the airflow takes place in the region of the bearing flange, i.e. on the side facing away from the stator housing. Thus, the airflow flows around the bearing flange and cools it as well. The heat absorbed by the bearings accommodated in the bearing flange is thereby dissipated in an effective manner.

A projection for the axial delimitation of the fan may be provided on the separating wall section. This is considered advantageous inasmuch as it allows for the precise and uncomplicated positioning of the fan.

The base plate section may have at least one, and in particular two recesses for the feedthrough of cables, and the stator housing may have a coating on the surface facing the housing, in particular on its external surface, in order to increase the emitted heat radiation, and the base plate section may have a central recess to accommodate a stator of an angle sensor. This has the advantage that electric lines as cables can easily be fed through from the stator space, and in particular from the stator windings to the sensor. As a result, a feedthrough of the lines is possible, and the airflow is separated from the cable bushing.

The second housing part may have pocket-type depressions on its surface, along which the airflow passes, in particular such that dirt, dust, etc. from the airflow is/are able to be deposited in the pocket-type depressions, especially air chambers, of the second housing part, a connection element, in particular a screw, connecting the first housing part to the second housing part, and the space region required for operating the connection element using a tool being made available by the depression.

This has the advantage that the pocket-type depressions are not only implemented as dust or dirt traps but also offer a free operating space for the implementation of the screwed connection between housing parts of the gear unit, and especially between the first and second housing part of the gear unit.

Further features and aspects of example embodiments of the present invention are described in greater detail below with reference to the Figures.

DETAILED DESCRIPTION

As illustrated in the Figures, the drive device has a gear unit that is driven by an electric motor.

The housing of the gear unit includes a first and a second housing part (1, 2). These housing parts (1, 2) are connected to each other by screws using a screwed connection (14).

First housing part 1 includes a gear stage that is connected downstream from an input stage, which is encompassed by second housing part 2.

Second housing part 2 not only accommodates a bearing of the input shaft but also a ring gear of the input gear stage implemented as a planetary gear stage.

Here, the ring gear is made of a first material such as steel, and second housing part 2 is made of a different material such as aluminum. As a result, the material that is absorbing and thus is spreading the heat apart has a better thermal conduction than the material of the ring gear. Thus, second housing part 2 absorbs heat from the ring gear and heat from the input bearing.

The input shaft is connected in a torque-resistant manner to a sun gear, which is in engagement with planetary wheels that are rotatably mounted on a planetary wheel carrier which is connected in a torque-resistant manner to the input toothing part of the downstream stage. The planetary wheels are with the internal toothing system of the ring gear.

The input shaft is connected to rotor 5 of the electric motor in a torque-resistant manner or is integrally arranged therewith, or in other words, is arranged as rotor shaft itself.

The electric motor is implemented as a synchronous motor, and rotor 5 includes permanent magnets.

Stator 6, which surrounds the rotor, has a laminated stator core which is composed of individual teeth carrying windings.

The laminated stator core is accommodated in a stator housing 3, which may be produced as a continuous casting component and includes recesses that extend in the axial direction, i.e. in the direction of the rotor shaft axis, and act as channels for an airflow.

The laminated stator core is frictionally connected to, especially thermally shrunk-fit onto, stator housing 3. To establish the connection, the laminated stator core and stator housing 3 have different temperatures prior to being joined to each other. After the temperatures have been adapted, the laminated stator core, which may be composed of steel sheet parts, and the stator housing, which may be made of aluminum, are frictionally connected.

A brake 7 and an angle sensor 8 are disposed in the B-side end region of rotor shaft 5, the rotor of angle sensor 8 being connected to rotor shaft 5 in a torque-resistant manner, and the stator of angle sensor 8 being accommodated in a bearing flange 31 in a torque-resistant manner, the bearing flange being connected to stator housing 3, in particular by screws, in a torque-resistant manner.

A housing 4, in particular a tubular housing, which surrounds the electric motor that is driving the gear unit, is connected to the housing of the gear unit, in particular to first housing part 1, with the aid of screws.

On the side facing away from the gear unit, housing 4, in particular the tubular housing, is sealed by a cover 10, which means that the electric motor is surrounded by a sealed space region.

The bearing flange has two axially uninterrupted recesses in which fans 11 may be placed, the fans conveying an airflow through the channels of the continuous casting component, i.e. stator housing 3. The airflow is conducted through recesses in second housing part 2 to the space region between stator housing 3 and housing 4, in particular the tubular housing, and from there back again through fans 11 to the channels in the continuous casting component, i.e. stator housing 3.

(The fan vanes of fan 11 are not shown in greater detail because fan is illustrated only schematically.)

However, even without the active conveyance effect of fans 11, which have a driving fan motor 30 in each case, the airflow is conveyed. The reason is that stator housing 3 outputs the heat generated by the motor to the airflow, meaning that the airflow is heated. In the installation direction shown in the Figures, i.e. with a gear unit that is situated at a higher level than the B-side end region of rotor shaft 5 and/or brake 7 and/or angle sensor 8, heated airflow 12 travels in the upward direction so that the air component disposed in the intermediate region outputs its heat at housing 4 and then descends. Thus, airflow 12 drops in a first radial clearance region and rises toward the top in a second radial clearance region, the first region being radially farther on the outside than the second region, i.e. the radial clearance values of the first region are greater than those of the second region. In other words, this convective flow makes it possible to achieve better cooling and does so in an uncomplicated manner.

The recesses formed in second housing part 2 are at least partially surrounded by fins 15 that radially project on housing part 2. Thus, the heat from the ring gear of the input stage and heat from the bearing of the input shaft accommodated in second housing part 2 are thus also able to be output to the airflow by way of fins 15.

In addition, the radial outer side of the laminated stator core is blackened, i.e. painted or coated by a dark or black color, for example.

In the same manner, the radial inner wall of housing 4 is blackened, i.e. painted or coated by a dark or black color, for instance.

In this manner, a radiation transport for a portion of the heat flow from the motor to the environment is additionally able to take place.

Figure 4:
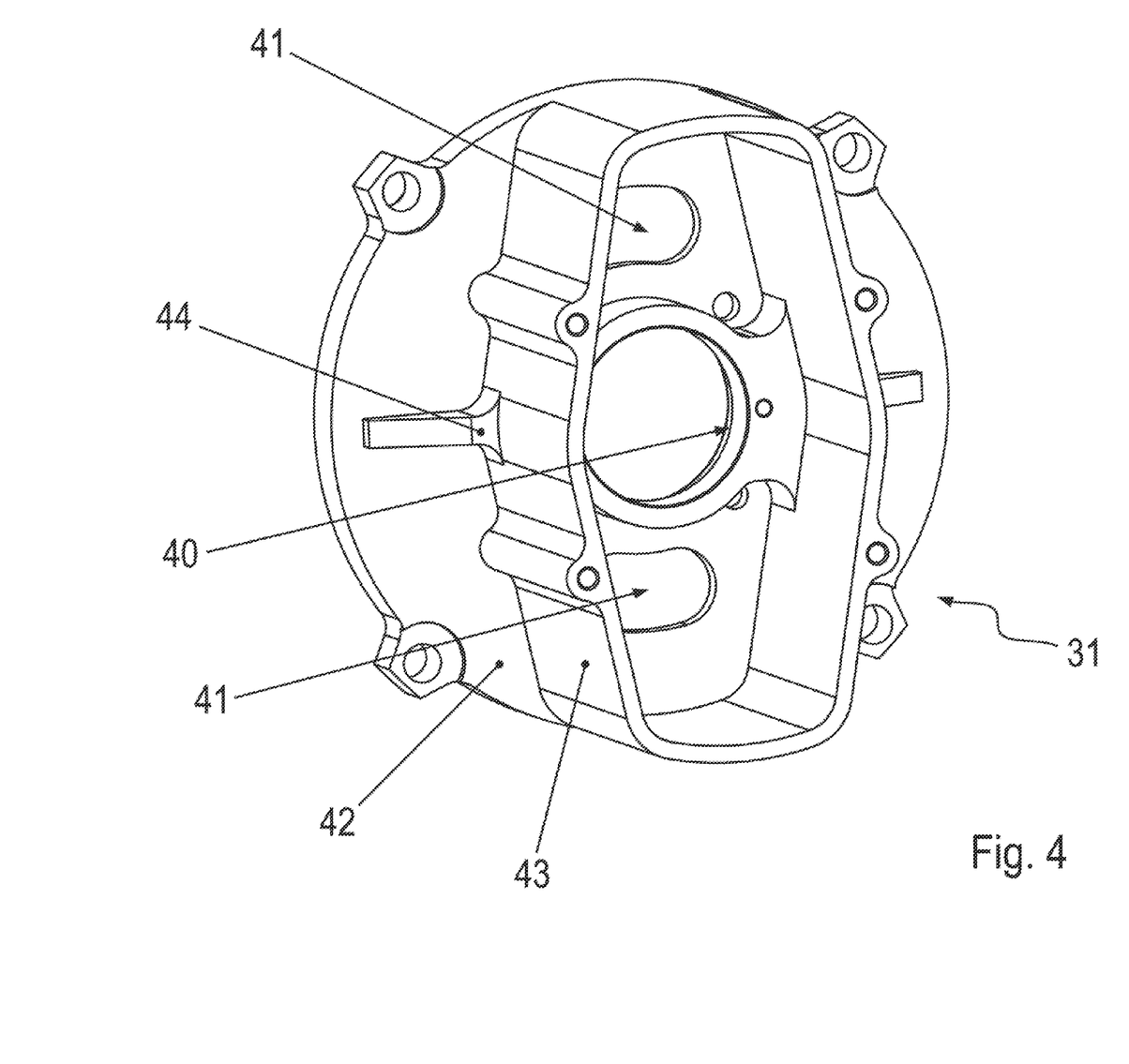
FIG. 4 is a perspective view of the B-side bearing flange.
Figure 5:
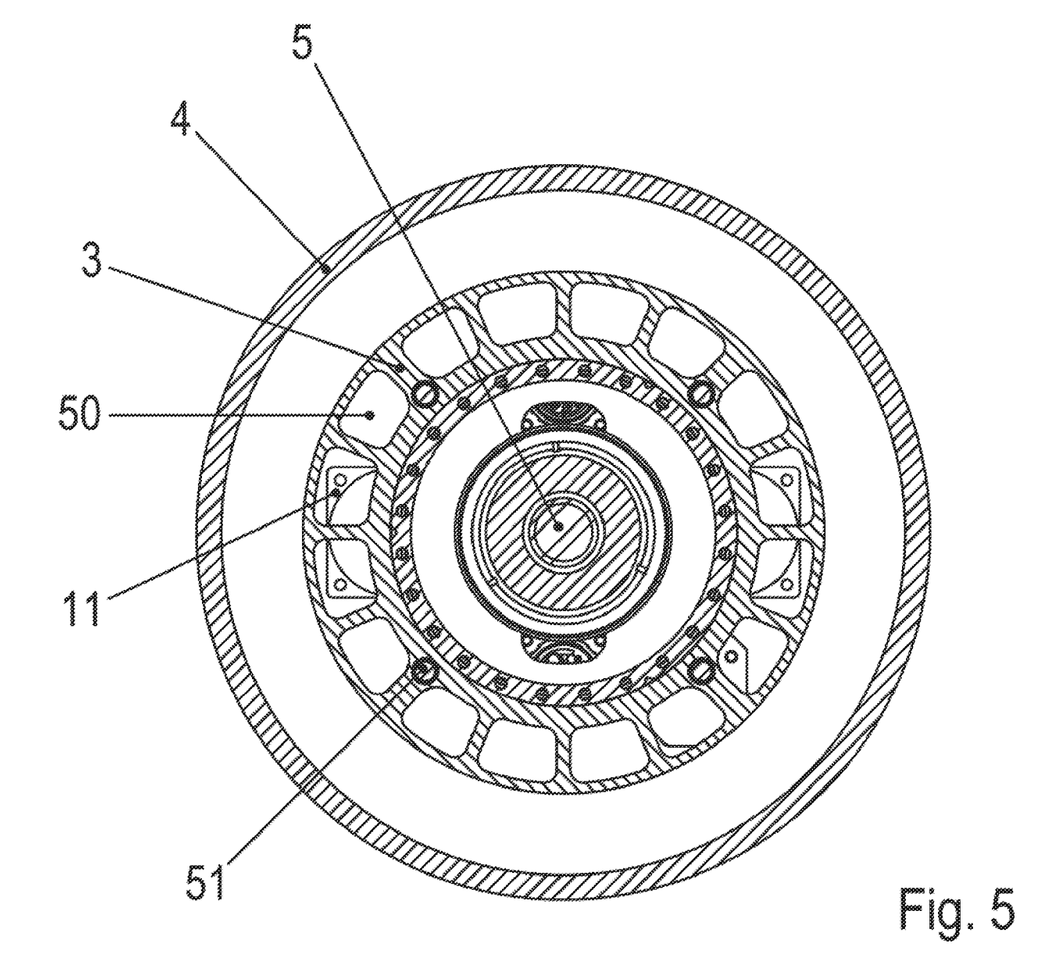
FIG. 5 is an associated cross-sectional view.

Bearing flange 31 has a base plate section 42 on which a separating wall section 43 is formed, in particular an oval-shaped separating wall section 43.

This separating wall section 43 separates the space region of airflow 12 from the space region surrounding the angle sensor. The part of angle sensor 8 projecting from base plate section 42 on the B-side, that is to say, on the axial side of base plate section 42 facing away from the gear unit, thus covers an axial region that is encompassed by the axial region covered by the separating wall section 43.

Base plate section 42 has two axially uninterrupted recesses 41, which are suitable for the feedthrough of cables from the space region of brake 7 and the motor to the space region that is at least partially surrounded by separating wall section 43, i.e. especially in the radial direction.

A centrally disposed receptacle 44 for angle sensor 8 is likewise provided in base plate section 42.

Separating wall section 43 has different radial clearances in different peripheral directions and is therefore asymmetrical in the peripheral direction, or in other words, is not rotationally symmetrical. The characteristic of the radial clearance from the peripheral angle is oval or similar to an oval. The narrow side allows for the placement of fans 11 adjacent to separating wall section 43; fans 11 in each case rest against a respective projection 44 in the axial direction, so that their axial position is easily fixable.

In addition, axially uninterrupted recesses may be provided in base plate section 42 for the passage of airflow 12 that is conveyable through fans 11.

Base plate section 42 has a circular radial outer edge.

Cover 10 seals separating wall section 43 so that the space region accommodating the angle sensor is separated from airflow 12.

Airflow 12 is delimited by cover 10, housing 4 and stator housing 3 as well as by second housing 2.

Stator housing 3 has an inner clearance 9 from housing 4 that essentially corresponds to the radial extension of a respective channel formed in stator housing 3.

The peripheral angle position of fins 15 of second housing part 2 are selected such that a respective radially extending separating wall is disposed at the same peripheral angle position. Airflow 12 thus emerges from the respective channel, disposed in the continuous casting component, and enters a respective recess of second housing part 2 that is at least partially delimited by fins 15. Then, airflow 12 emerges from the recess of second housing part 2 and enters a space region that encompasses the intermediate space region between the stator housing part and housing 4.

Figure 1:
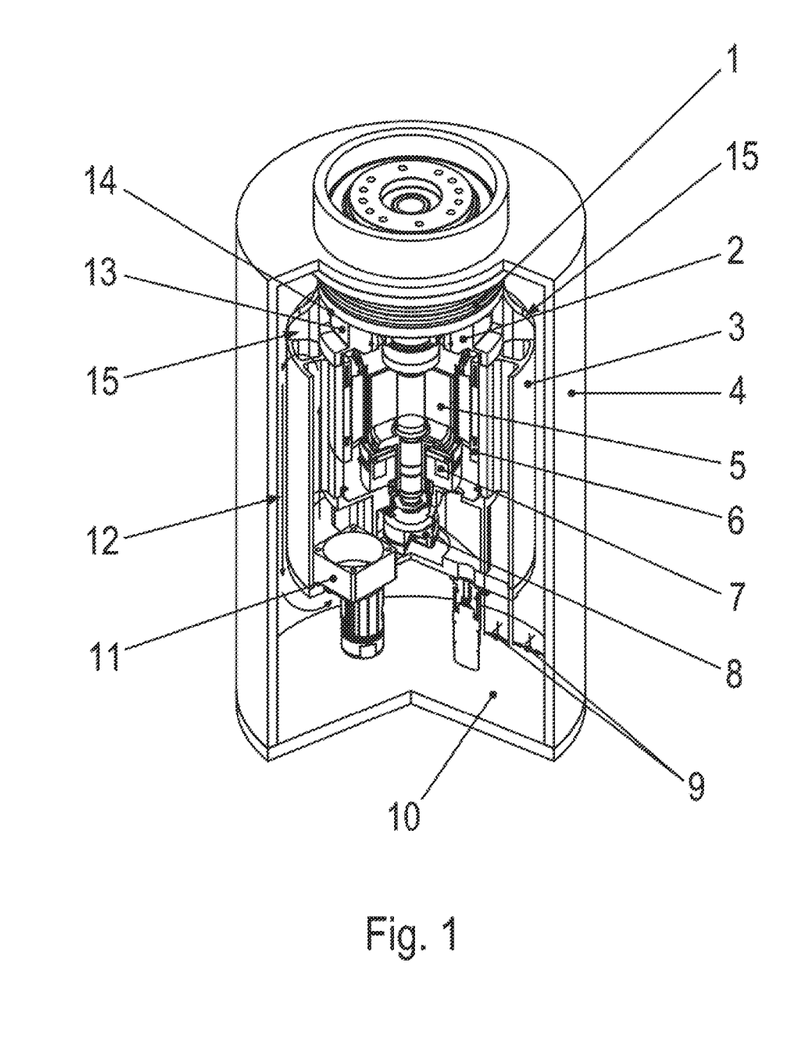
FIG. 1 is a perspective, partial cross-sectional view of a drive device according to an example embodiment of the present invention.
Figure 2:
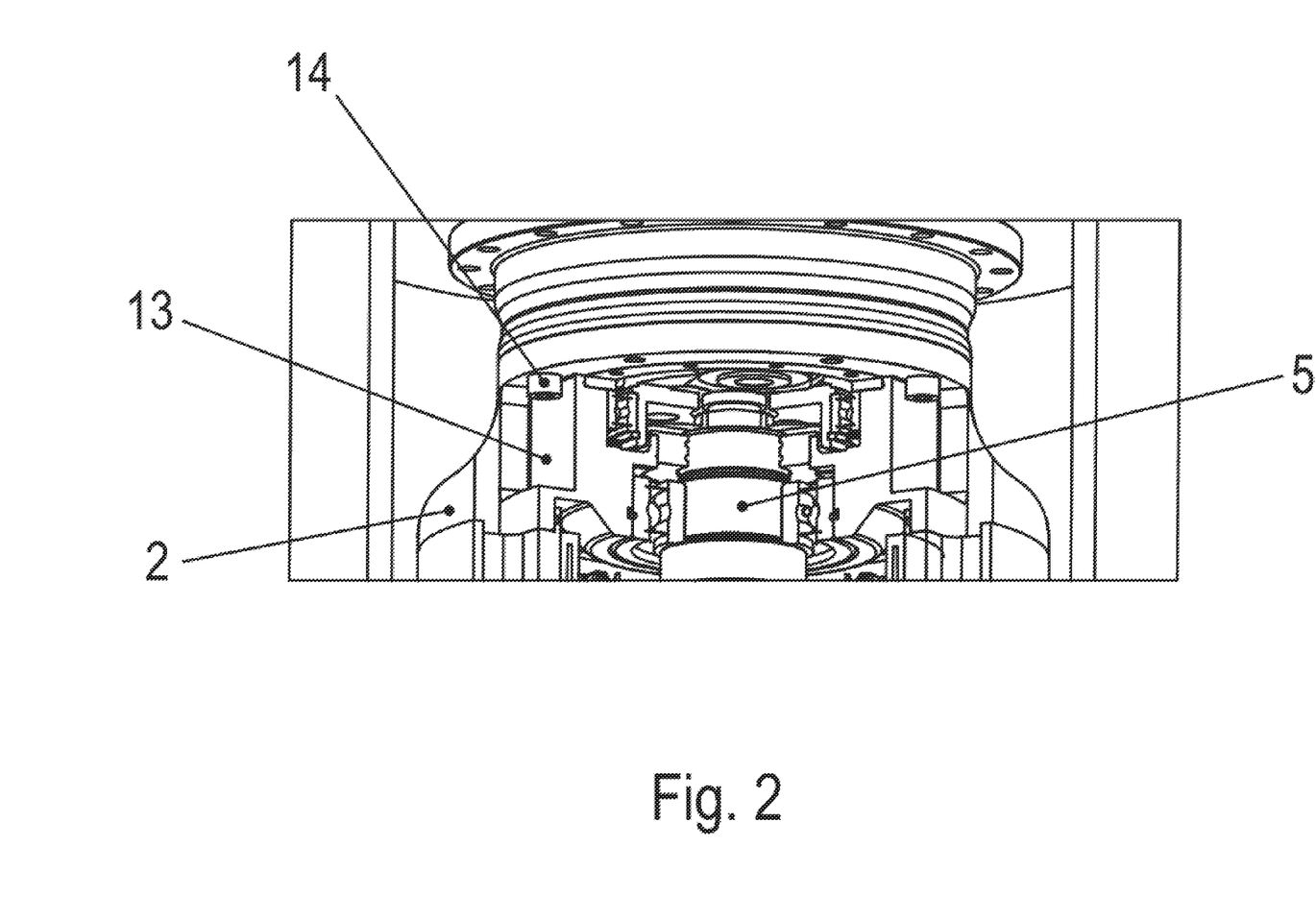
FIG. 2 is another cross-sectional view from a different perspective.
Figure 3:
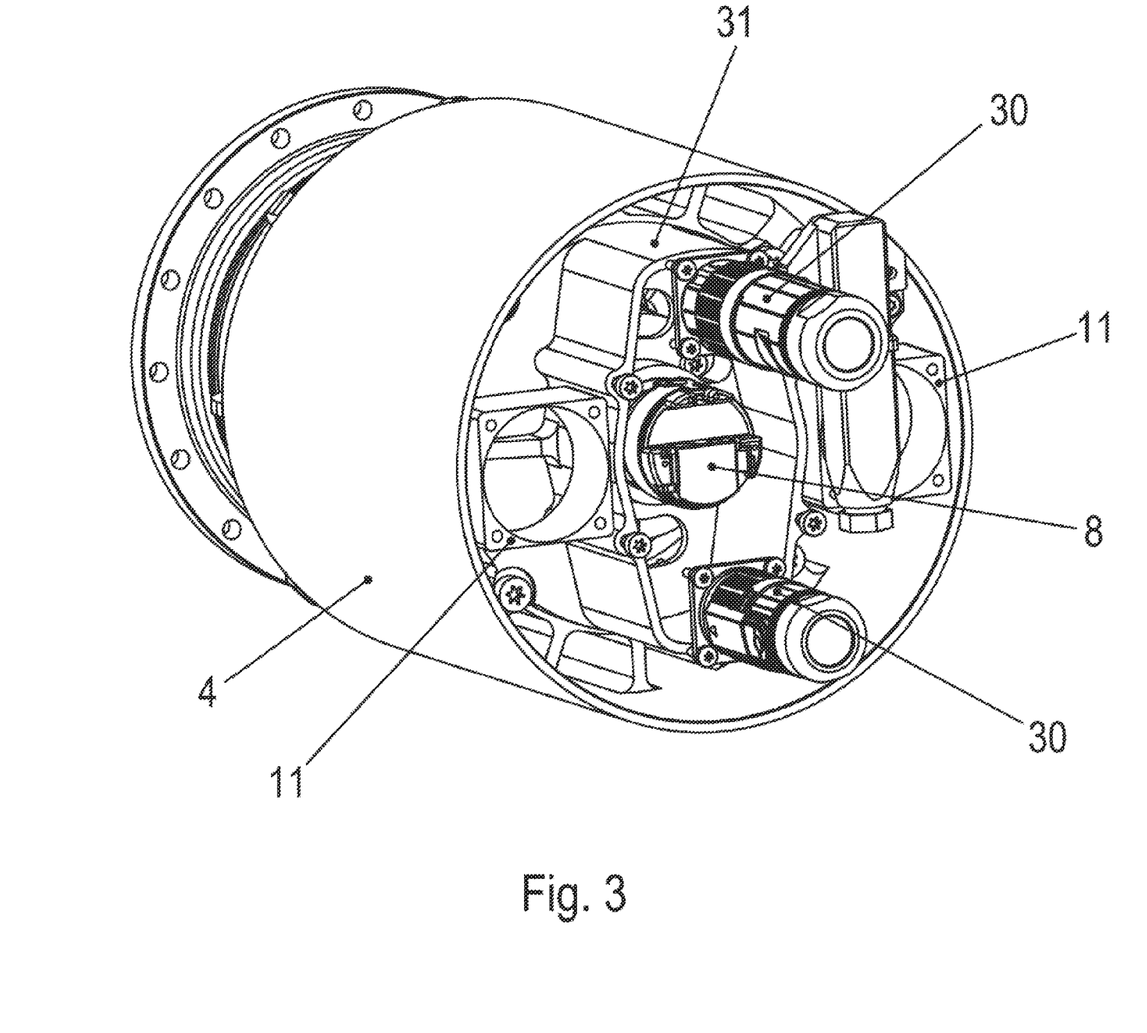
FIG. 3 is a perspective view of the B-side end of the drive device.

As shown in FIG. 1, housing 4 is arranged in the shape of a cup, and first housing part 1 of the gear unit is at least partially inserted and connected in a recess of the cup bottom. The output shaft of the gear unit thus leads through this recess of the cup bottom.

While flowing through the recesses in second housing part 2, airflow 12 flows past pocket-type depressions 13 of second housing part 2, which also causes turbulence to be generated in the region of the respective depression 13 so that dust and/or dirt is deposited at depression 13.

In addition, the depressions are not only pockets for collecting dirt but offer an improved and/or expanded operating range for operating screws 14 that allow the first housing part to be connected to the second housing part (1, 2). Screws 14 have an axial orientation and are guided through a respective, axially uninterrupted recess, especially a bore, and screwed into a threaded bore of first housing part 1. As an alternative, the screw is also guided through the uninterrupted recess in the first and second housing part (1, 2). Depression 13 is radially delimited inwardly by second housing part 2, but is open radially outwardly.

LIST OF REFERENCE NUMERALS

1 First housing part of the gear unit
2 Second housing part of the gear unit, in particular prestage housing
3 Stator housing, in particular continuous casting component
4 housing, in particular tubular housing
5 Rotor
6 Stator 7 Brake
8 Sensor
9 Clearance height
10 Cover
11 Fan
12 Airflow
13 Pocket, in particular depression on second housing part
14 Screwed connection between first housing part and second housing part
15 Fin
30 Fan motor
31 Bearing flange, in particular B-side bearing flange of the electric motor
40 Sensor receptacle
41 Cable bushing, in particular axially uninterrupted recess for the feedthrough of cables
42 Base plate section
43 Separating wall section, in particular oval-shaped separating wall section
44 Projection for delimiting fan 11
50 Recess in stator housing 3
51 Bore for screws

The invention claimed is:

1. A drive device, comprising:
   a gear unit; and
   an electric motor adapted to drive the gear unit, the electric motor including a laminated stator core which has stator windings and is accommodated in a stator housing;
   wherein the stator housing includes recesses that are axially uninterrupted, the stator housing being surrounded and/or radially surrounded by a housing, a tubular housing, and/or a cup-shaped housing of the drive device, the housing being set apart from the stator housing, such that an airflow and/or a circulating airflow is generatable within the housing, the recesses adapted to guide the airflow through in an axial direction, the airflow returnable in an opposite direction in a set-apart region between the stator housing part and the housing.

2. The drive device according to claim 1, wherein the recesses are axially uninterrrupted in a direction of a rotor shaft axis.

3. The drive device according to claim 1, wherein the stator housing includes a continuous casting component, and a drawing direction extends parallel to the axial direction and/or parallel to a direction of a rotor shaft axis.

4. The drive device according to claim 1, wherein the gear unit has a first housing part and a second housing part connected to each other, the stator housing being connected to and/or screw-connected to the second housing part, and the housing, the tubular housing, and/or the cup-shaped housing of the drive device being connected to and/or screw-connected to the second housing part.

5. The drive device according to claim 4, wherein the drive device is arranged such that the airflow flows from the recesses of the stator housing through individual recesses of the second housing part.

6. The drive device according to claim 5, wherein the individual recesses of the second housing part are at least partially delimited by fins that project from the second housing part.

7. The drive device according to claim 4, wherein the second housing part has pocket-type depressions at a surface along which the airflow flows, so that dirt and/or dust from the airflow is depositable in the pocket-type depressions and/or in air chambers of the second housing part, a connection element and/or a screw connecting the first housing part to the second housing part, and a space region required to operate the connection element using a tool is provided by the depression.

8. The drive device according to claim 1, wherein the housing is made of a first material and the stator housing is made from a second material, the first material having a greater thermal conductivity than the second material.

9. The drive device according to claim 1, wherein the housing includes a coating on a surface facing the stator housing and/or on an internal surface, to increase absorbed heat output.

10. The drive device according to claim 1, wherein the airflow is driven convectively and/or solely convectively.

11. The drive device according to claim 1, further comprising at least one fan and/or two fans, adapted to drive the airflow, disposed on a bearing flange of the motor.

12. The drive device according to claim 11, wherein a bearing of a rotor shaft of the motor is accommodated in the bearing flange.

13. A drive device, comprising:
   a gear unit; and
   an electric motor adapted to drive the gear unit, the electric motor including a laminated stator core which has stator windings and is accommodated in a stator housing;
   wherein the stator housing includes recesses that are axially uninterrupted, the stator housing being surrounded and/or radially surrounded by a housing, a tubular housing, and/or a cup-shaped housing of the drive device, the housing being set apart from the stator housing, such that an airflow and/or a circulating airflow is generatable within the housing, the recesses adapted to guide the airflow through in an axial direction, the airflow returnable in an opposite direction in a set-apart region between the stator housing part and the housing;
   the drive device further comprising two fans and/or at least one fan, adapted to drive the airflow, disposed on a bearing flange of the motor;
   wherein the bearing flange includes a circular base plate section and a separating wall section that is disposed on the base plate section, the separating wall section adapted to separate the airflow from a space region that surrounds a B-side axial end region of a rotor shaft facing away from the gear unit and/or that at least partially surrounds an angle sensor disposed in the B-side axial end region.

14. The drive device according to claim 13, wherein the separating wall section includes a smaller radial extension in a first peripheral angle direction than in a second peripheral angle direction that differs from the first peripheral angle direction.

15. The drive device according to claim 14, wherein the fan is disposed radially outside the separating wall section, and the fan is set apart from the second peripheral angle direction in the peripheral direction, a peripheral angle section covered by the fan encompassing the first peripheral angle.

16. The drive device according to claim 13, wherein the separating wall section is arranged on an axial side of the base plate section facing away from the gear unit, and/or a projection for axial delimitation of the fan is arranged on the separating wall section.

17. The drive device according to claim 13, wherein the base plate section has at least one and/or two recesses for feedthrough of cables, the stator housing having a coating on a surface facing the housing and/or on an external surface, to increase emitted heat radiation, the base plate section including a central recess adapted to accommodate a stator of an angle sensor.

* * * * *